United States Patent
Yadav

(10) Patent No.: US 10,377,849 B2
(45) Date of Patent: Aug. 13, 2019

(54) IONIC AND ELECTRONIC CONDUCTING BINDER FOR ELECTROCHEMICAL DEVICES

(71) Applicant: Nissan North America, Inc., Franklin, TN (US)

(72) Inventor: Rameshwar Yadav, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 23 days.

(21) Appl. No.: 15/810,819

(22) Filed: Nov. 13, 2017

(65) Prior Publication Data
US 2019/0144600 A1    May 16, 2019

(51) Int. Cl.
H01M 4/04        (2006.01)
C08G 61/12       (2006.01)
H01M 4/60        (2006.01)

(52) U.S. Cl.
CPC ............ C08G 61/126 (2013.01); H01M 4/04 (2013.01); H01M 4/602 (2013.01); *C08G 2261/143* (2013.01); *C08G 2261/1424* (2013.01); *C08G 2261/1452* (2013.01); *C08G 2261/1522* (2013.01); *C08G 2261/228* (2013.01); *C08G 2261/3223* (2013.01); *C08G 2261/516* (2013.01)

(58) Field of Classification Search
USPC ........................... 525/410; 429/480, 482, 483
See application file for complete search history.

(56) References Cited

U.S. PATENT DOCUMENTS

| | | | |
|---|---|---|---|
| 8,585,931 B2 | 11/2013 | Hsu et al. | |
| 9,601,777 B2 | 3/2017 | Lee et al. | |
| 9,694,357 B1 | 7/2017 | Yadav | |
| 2010/0316931 A1 | 12/2010 | Wieland | |
| 2013/0244133 A1* | 9/2013 | Wieland | ......... H01M 4/926 429/482 |
| 2017/0274368 A1 | 9/2017 | Yadav | |
| 2017/0279144 A1 | 9/2017 | Yadav | |
| 2017/0279145 A1 | 9/2017 | Yadav | |

* cited by examiner

Primary Examiner — Terressa Boykin
(74) Attorney, Agent, or Firm — Young Basile Hanlon & MacFarlane, P.C.

(57) ABSTRACT

An ion conducting and electron conducting polymer is comprised of a first polymer of a single-sulfonic acid polymer or a multi-sulfonic acid polymer and a second polymer of an EDOT analog monomer having the following formula:

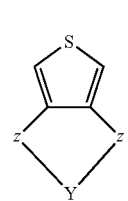

wherein z=O or S;

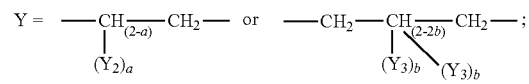

$Y_2$=—COH, —$C_6H_{13}$, or —COOH; a=0 or 1; $Y_3$=—$CH_3$, —$C_2H_5$, —$CH_2C_6H_6$, —$C_6H_{13}$, —$C_8H_{17}$, —$CH_2OC_6H_{13}$, or —$CH_2OC_6H_6$; and b=0 or 1; wherein a sulfonic acid group of each branch of the first polymer electronically interacts with one or more thiophene rings of the second polymer; and wherein any remaining sulfonic acid groups on each branch of the first polymer are converted to $SO_3Li$.

21 Claims, 1 Drawing Sheet

IONIC AND ELECTRONIC CONDUCTING BINDER FOR ELECTROCHEMICAL DEVICES

TECHNICAL FIELD

This disclosure relates to improved binders for electrode active catalyst material, and in particular, to ionic and electronic conducting binders for electrochemical devices.

BACKGROUND

Electrodes of electrochemical devices such as batteries and fuel cells are composed of active material particles, conductive agents, and a polymer binder. The active material particles are loose, fragile powder that need some support to hold the particles together to form a contiguous structure. The active material particles also need to be cast into a layer onto a current collector. Binder materials are responsible for holding the active material particles within the electrode together to maintain a strong connection between the electrode and the contacts.

It is the binder that enables the active material particles to hold together and to form a layer on the current collectors. Typically, these binders are dissolved in solvents such as water to form a solution or dispersion. The active material particles, conductive agent, and binder are mixed together via various methods to form a homogeneous slurry. This slurry is coated onto the current collector and dried to remove the solvent and then pressed to form a smooth and uniform layer. The stability of the electrodes, especially from swelling and contracting due to movement of ions during charge and discharge, is dependent on the binder.

Conventional binders are insulators, lack any ionic and electrical conductivity, are inert, and make no contribution towards the mass and volumetric capacity, energy density, and power density of the electrochemical devices in which they are used.

SUMMARY

Disclosed herein are implementations of ion conducting and electron conducting polymers that can be used as a binder in electrochemical devices, as a non-limiting example. One embodiment of an ion conducting and electron conducting polymer as disclosed herein is PEDOT: multi-lithium sulfonate polymer formed of A or formed of A and B:

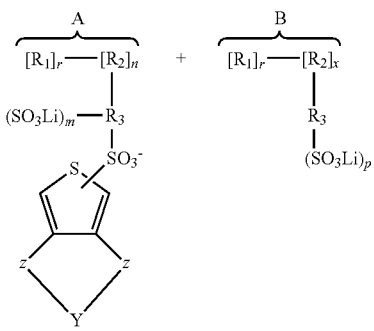

wherein $R_1$ is a linear polymer portion and $R_2$ is a branched polymer portion of a single-sulfonic acid polymer or a multi-sulfonic acid polymer, $R_3$ represents a branch having sulfonic acids substituted with Li or an 3,4-ethylenedioxythiophene (EDOT) analog as depicted; $r \geq 0$; $n > 1$; $x > 1$; $m = 0$, 1, 2 or 3; and $p = 1$, 2 or 3; and B is randomly located in the PEDOT: multi-lithium sulfonate polymer; and $z = O$ or $S$;

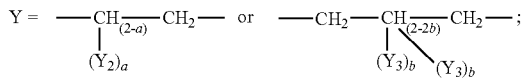

$Y_2 =$ —COH, —$C_6H_{13}$, or —COOH; $a = 0$ or 1; $Y_3 =$ —$CH_3$, —$C_2H_5$, —$CH_2C_6H_6$, —$C_6H_{13}$, —$C_8H_{17}$, —$CH_2OC_6H_{13}$, or —$CH_2OC_6H_6$; and $b = 0$ or 1.

Another embodiment of an ion conducting and electron conducting polymer is comprised of a first polymer of a single-sulfonic acid polymer or a multi-sulfonic acid polymer and a second polymer of an EDOT analog monomer having the following formula:

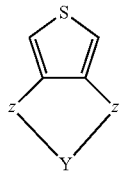

wherein

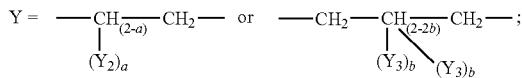

$Y_2 =$ —COH, —$C_6H_{13}$, or —COOH; $a = 0$ or 1; $z = O$ or $S$; $Y_3 =$ —$CH_3$, —$C_2H_5$, —$CH_2C_6H_6$, —$C_6H_{13}$, —$C_8H_{17}$, —$CH_2OC_6H_{13}$, or —$CH_2OC_6H_6$; and $b = 0$ or 1; wherein a sulfonic acid group of each branch of the first polymer electronically interacts with one or more thiophene rings of the second polymer; and wherein any remaining sulfonic acid groups on each branch of the first polymer are converted to $SO_3Li$.

The PEDOT: multi-lithium sulfonate polymer can be made by polymerizing an EDOT analog monomer to form a PEDOT analog polymer; reacting the PEDOT analog polymer with a single-sulfonic acid polymer or a multi-sulfonic acid polymer, wherein a weight ratio of single-sulfonic acid polymer to PEDOT analog polymer is greater than 1.0 and a weight ratio of mullet-sulfonic acid polymer to PEDOT analog polymer is greater than or equal to 1.0; ion exchanging hydrogen with lithium using LiOH or LiCl to convert excess —$SO_3H$ to —$SO_3Li$.

Also disclosed are electrodes comprising the ion conducting and electron conducting polymers disclosed herein, as well as electrochemical devices incorporating the electrodes.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
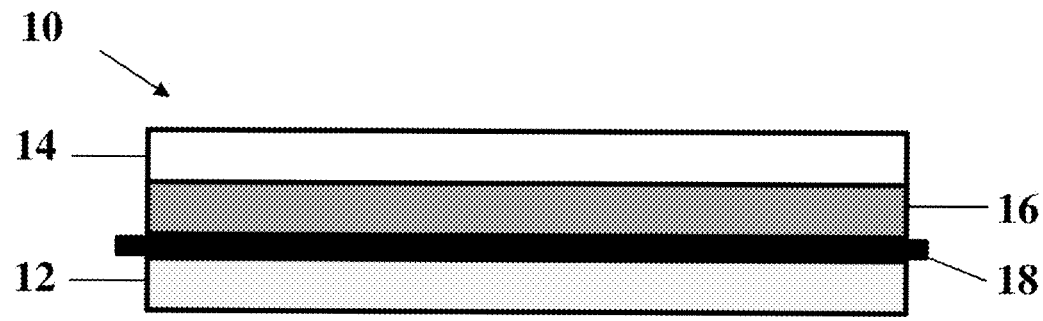
FIG. 1 is a schematic of an electrode incorporating the ion conducting and electron conducting polymer disclosed herein as a binder.

The binder plays an important role in the functioning and manufacturing of batteries, fuel cells and other electrochemical devices. Generally, the electrode contains up to 1-8 wt. % polymer binder and 1-5 wt. % conductive agents. Conventional binders include carboxymethyl cellulose (CMC), styrene butadiene rubber (SBR), polyvinylidene fluoride (PVDF), poly(vinylidene fluoride-hexafluoropropylene) (PVDF-HFP), polyacrylic acid (PAA), polyvinylpyrrolidone (PVP), polyethylenimine (PEI), and lithium polyacrylate. CMC and SBR are water-based binders while some binders, such as PVDF, require a solvent such as n-methyl-2-pyrrolidone (NMP), which is an environmentally hazardous solvent.

These polymers bind well, but are insulators, lack any ionic and electrical conductivity, are inert, and make no contribution towards the mass and volumetric capacity, energy density, and power density of the electrochemical devices in which they are used. As a non-limiting example, in silicon-based electrodes where the silicon particles undergo large volume changes, these binders fail to provide electrical contact between active silicon particles, the conductive agent, and the current collector. The weight and volume fraction of the binder and the conductive agent in the electrode is significant. Due to these inert binders and conductive agents, the weight of active materials cannot be increased beyond certain value. This limits the mass and volumetric capacity of batteries, fuel cells and other electrochemical devices.

Hence, there is a need to develop a binder that can conduct both ions and electrons. Binders that possess the ability to conduct electrons may eliminate the need for the conducting agent. The conducting polymer binder can play the many roles of conducting electrons and ions, holding the active particles together and maintaining the integrity of the electrodes. Without the requirement of the conducting agent, the mass of active material particles may be increased, improving the performance of the electrode.

Poly(3,4-ethylenedioxythiophene) doped with poly(styrene sulfonate) as counter ions (PEDOT:PSS) is a conductive polymer for potential use as a binder. PEDOT:PSS is easily dispersible in water as well as in other polar solvents. The electrical conductivity of PEDOT:PSS is comparable to currently used conductive agents used in electrodes. PEDOT:PSS has electrochemical stability in the operating voltage range of batteries. However, PEDOT:PSS lacks the ionic conductivity and adequate flexibility to be used as a single binder in electrode active material. PEDOT:PSS is brittle and must be used in conjunction with other supporting binders such as CMC, SBR and PVDF. PEDOT:PSS also lacks thick film forming ability and can only be used in thin electrodes. When used in thick electrodes, the electrode becomes structurally unstable and the electrode delaminates from the current collector. Accordingly, PEDOT:PSS falls short of the requirements for use as a conductive binder that can be used in thick electrodes, provide the requisite mechanical strength and replace both the binder and the conducting agent.

The dual conductive polymer binders disclosed herein are electrochemically stable in the operating voltage window of the electrochemical device, are easy to handle, flexible, stretchable and/or rollable to produce a uniform coating on the current collector, easy to dissolve in an environmentally benign solvent, can be used as the only binder and can replace the conducting agent. The dual conductive binders disclosed herein can be used in various applications such as batteries, fuel cells, capacitors, flow-batteries and other applications where powder or loose particles must be held together. The dual conductive binders can be used in any environment where electrical conductivity, ionic conductivity and flexibility are needed.

Dual conductive binders, i.e., both ion conducting and electron conducting, disclosed herein are comprised of a first polymer of a single-sulfonic acid polymer or a multi-sulfonic acid polymer and a second polymer of an 3,4-ethylenedioxythiophene (EDOT) analog monomer polymerized to form a PEDOT analog. As used herein "PEDOT: multi-lithium sulfonate polymers" refers to dual conductive binders wherein the second polymer is a PEDOT or a PEDOT analog. A sulfonic acid group of each branch of the first polymer electronically interacts with one or more thiophene rings of the second polymer. Any remaining sulfonic acid groups on each branch of the first polymer are converted to $SO_3Li$. Sulfonic acids of any excess branches not electronically interacting with the second polymer are converted to $SO_3Li$.

The first polymer starting material can be any single-sulfonic acid polymer or a multi-sulfonic acid polymer. Non-limiting examples of multi-sulfonic acid polymers include:

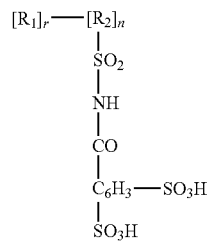

wherein $R_1$-$R_2$ is the non-sulfonyl halide portion of 3,5-bis (fluorosulfonyl) benzoic acid;

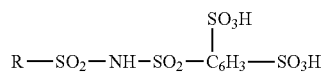

wherein R is the non-sulfonyl halide portion of 1,3,5-benzene trisulfonyl chloride or 1,3,5 tris[(fluorosulfonyl)];

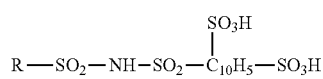

wherein R is the non-sulfonyl halide portion of naphthalene-1,2,6-trisulfonyl chloride; and

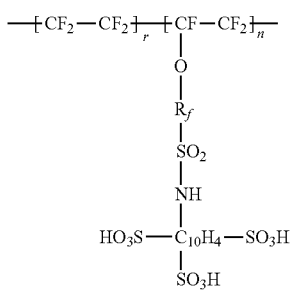

wherein $R_f=-CF_2-CF(CF_3)-O-(CF_2)_2-$, $-(CF_2)_4-$, or $-(CF_2)_2-$, r=3-13.5, and n>1.

Non-limiting examples of single-sulfonic acid polymers include $R-SO_2-NH-SO_2-(CF_2)_3-SO_3H$ wherein R is the non-sulfonyl halide portion of 1,1,2,2,3,3-hexafluoro-propane-1,3-disulfonyl difluoride;

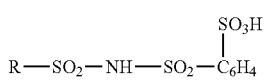

wherein R is the non-sulfonyl halide portion of benzene-1,3-disulfonyl chloride or benzene-1,2-disulfonyl chloride;

$R-SO_2-NH-SO_2-(CF_2)_4-SO_3H$ wherein R is the non-sulfonyl halide portion of perfluorobutane-1,4-bis-sulfonyl chloride or perfluorobutane-1,4-bis-sulfonyl fluoride;

$R-SO_2-NH-SO_2-O-(CF_2)_4-O-SO_3H$ wherein R is the non-sulfonyl halide portion of 1,4-bis(fluorosulfonyloxy)-octafluorobutane.

$R-SO_2-NH-SO_2-(CF_2)_2-O-(CF_2)_2-SO_3H$ wherein R is the non-sulfonyl halide portion of bis[2-(fluorosulfonyl)tetrafluoroethyl] ether;

The following structures also represent single-sulfonic acid polymers:

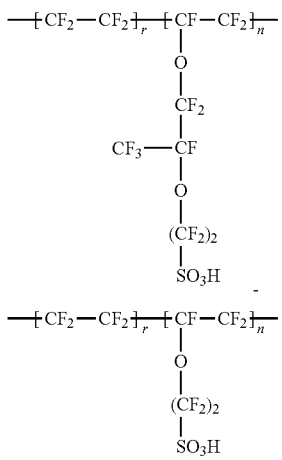

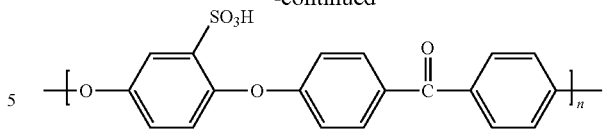

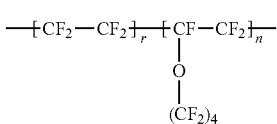

Single-sulfonic acid polymers also include poly(2-acrylamido-2-methyl-1-propanesulfonic acid), poly(2-acrylamido-2-methyl-1-propanesulfonic acid-co-acrylonitrile), poly(2-acrylamido-2-methyl-1-propanesulfonic acid-co-styrene), poly(2-acrylamido-2-methyl-1-propanesulfonic acid) and copolymer thereof, represented by the following formula:

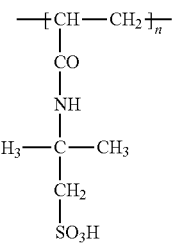

Single-sulfonic acid polymers also include poly(3-allyloxy-2-hydroxypropane sulfonic acid) obtained from 3-allyloxy-2-hydroxypropane sulfonate, poly(1-allyloxy-2-hydroxypropane) sulfonic acid obtained from 1-allyloxy-2-hydroxypropane) sulfonate, poly (allyloxy polyethoxy sulfonic acid) obtained from allyloxy polyethoxy ammonium sulfate where n depends on molecular weight, poly (vinylsulfonic acid) obtained from vinylsulfonic acid, poly (2-methyl-2-propene-1-sulfonic acid) obtained from 2-methyl-2-propene-1-sulfonic acid, and poly(2-propene-1-sulfonic acid) obtained from 2-propene-1-sulfonic acid, the following being a representative structure:

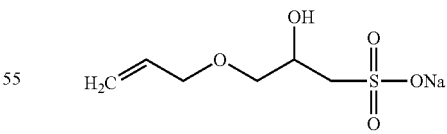

The single-sulfonic acid and multi-sulfonic acid polymers herein are non-limiting examples. In addition, U.S. patent application Ser. Nos. 15/078,209; 15/591,682; 15/078,134; and U.S. Pat. No. 9,694,357 are incorporated herein by reference with regard to single-sulfonic acid and multi-sulfonic acid polymers.

The second polymer of the EDOT analog monomer has the following formula:

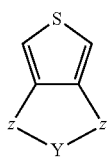

wherein z=O or S;

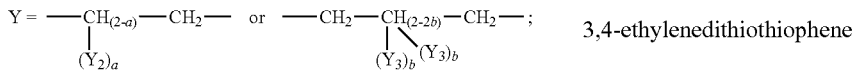

Y$_2$=—COH, —C$_6$H$_{13}$, or —COOH; a=0 or 1; Y$_3$=—CH$_3$, —C$_2$H$_5$, —CH$_2$C$_6$H$_6$, —C$_6$H$_{13}$, —C$_8$H$_{17}$, —CH$_2$OC$_6$H$_{13}$, or —CH$_2$OC$_6$H$_6$; and b=0 or 1.

Examples of EDOT analog monomers include: 3,4-ethylenedioxythiophene (EDOT)

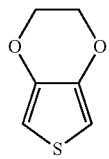

EDOT carboxylic acid

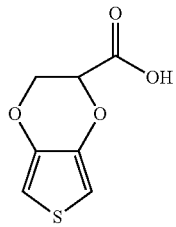

hydroxymethyl EDOT

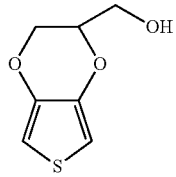

3,4-(2',2'-diethylpropylenedioxy)thiophene

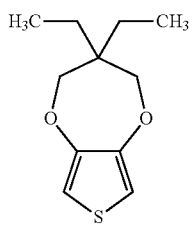

3,4-propylenedioxythiophene

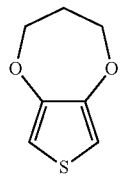

3,4-ethylenedithiothiophene

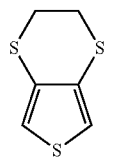

3,4-(2,2-dimethylpropylenedioxy)thiophene

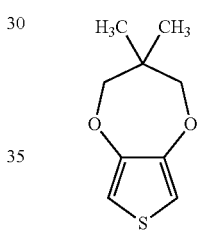

3,4-(2,2-dibenzylpropane-1,3-diyldioxy)thiophene

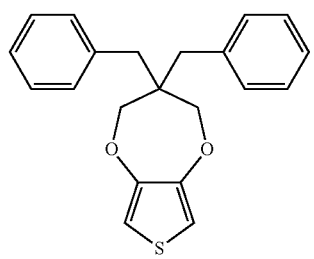

DBPD 3-hexyl-2,3-dihydrothieno[3,4-b][1,4]dioxine

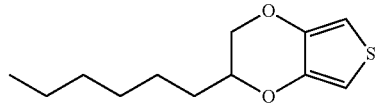

3,3-dihexyl-2,4-dihydrothieno[3,4-b][1,4]dioxepine

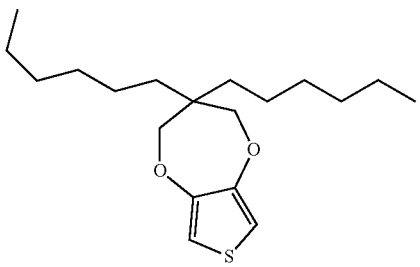 [SMILES: CCCCCCC1(CCCCCC)COc2cscc2OC1]

3,3-bis(hexoxymethyl)-2,4-dihydrothieno[3,4-b][1,4]dioxepine

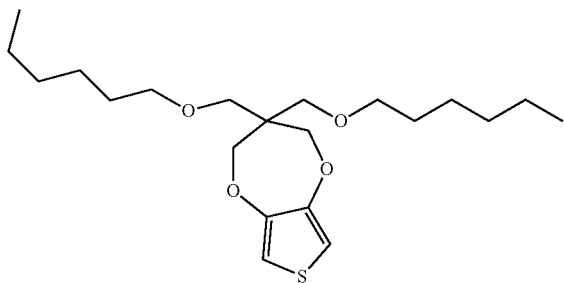 [SMILES: CCCCCCOCC1(COCCCCCC)COc2cscc2OC1]

3,3-dioctyl-2,4-dihydrothieno[3,4-b][1,4] dioxepine

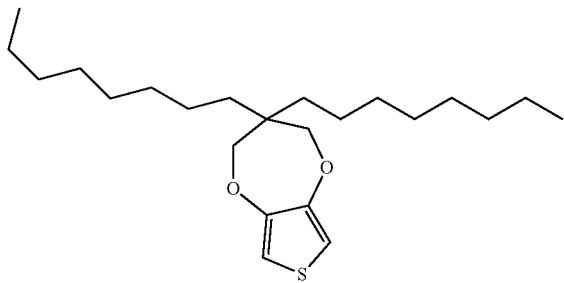 [SMILES: CCCCCCCCC1(CCCCCCCC)COc2cscc2OC1]

3,3-bis(phenoxymethyl)-2,4-dihydrothieno[3,4-b][1,4]dioxepine

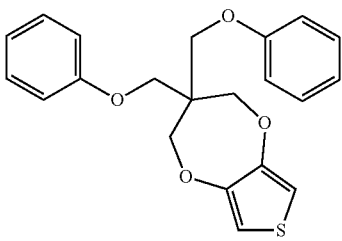 [SMILES: c1ccc(OCC2(COc3ccccc3)COc3cscc3OC2)cc1]

The ion conducting and electron conducting polymers disclosed herein are referred to as PEDOT: multi-lithium sulfonate polymers, with the PEDOT representing polymerized EDOT analog monomer. "EDOT analog monomer" as used herein includes EDOT itself. The ion conducting and electron conducting polymers are produced by polymerizing an EDOT analog monomer to form a PEDOT analog polymer. The polymerization can be done by methods known to those skilled in the art and can include photopolymerization, emulsion polymerization, solution polymerization, suspension polymerization, and precipitation polymerization, as non-limiting examples.

The PEDOT analog polymer is reacted with a single-sulfonic acid polymer or a multi-sulfonic acid polymer. When a single-sulfonic acid polymer is used, a weight ratio of single-sulfonic acid polymer to PEDOT analog polymer is greater than 1.0. This is because a sulfonic acid group of each branch of the first polymer electronically interacts with one or more thiophene rings of the second polymer, so if the first polymer is a single-sulfonic acid polymer, excess of the first polymer must be used to provide sulfonic acid sites to be lithiated to produce the ionic conductivity alongside the electronic conductivity provided by the PEDOT analog polymer. This ionic conductivity is produced by converting remaining branches with a sulfonic acid group of the first polymer to $SO_3Li$ by ion exchanging hydrogen with lithium using LiOH or LiCl to convert excess —$SO_3H$ to —$SO_3Li$.

When a multi-acid polymer is used, a weight ratio of multi-sulfonic acid polymer to PEDOT analog polymer is greater than or equal to 1.0. When the ratio is equal to 1.0, ionic conductivity is achieved by the additional sulfonic acid groups on each branch that are ion exchanged with lithium using LiOH or LiCl to convert the remaining —$SO_3H$ to —$SO_3Li$. When the ratio is greater than 1.0, additional ionic conductivity is achieved due to the additional branches not reacted with the PEDOT analog polymer being ion exchanged with lithium using LiOH or LiCl to convert the excess —$SO_3H$ to —$SO_3Li$.

When the branch of the single-sulfonic acid polymer or the multi-sulfonic acid polymer includes —NH—, the —NH— is also ion exchanged with lithium using LiOH or LiCl to convert the —NH— to —NLi—, providing additional ionic conductivity.

As a non-limiting example, polymerizing can be initiated with sodium persulfate at 1:1 molar ratio with EDOT analog monomer and iron (III) sulfate or iron chloride at 1:70 molar ratio with sodium persulfate. Reacting can occur in a polar solvent such as water, acetonitrile, DMSO, methanol, and ethylene glycol, at room temperature or less for a period of time greater than 24 hours with continuous stirring and purging with nitrogen or another inert gas. Ion exchange can be performed by mixing the reacted polymers with cation and anion exchange resin for a period of time and filtering to remove any initiators and impurities.

A non-limiting example of an ion conducting and electron conducting polymer as disclosed herein is made from a EDOT as the EDOT analog monomer with the following first formula

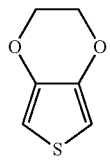

and a single-sulfonic acid polymer having the second formula as the first polymer:

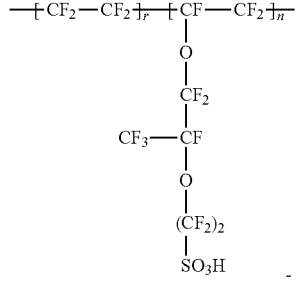

The ion conducting and electron conducting polymer has the following formula I wherein n>1 and m>1 to form a PEDOT: multi-lithium sulfonate polymer that is both ion conducting and electron conducting:

The PEDOT carries a positive charge that interacts with the negative charge of the deprotonated sulfonic acid of the first polymer. This Coulombic interaction is illustrated with the broken lines in the above structure. Because the first polymer is a single-sulfonic acid polymer, an excess of the first polymer is used in the reaction to provide additional sulfonic acid to be ion exchanged with LiOH or LiCl to form $SO_3Li$ for ion conductivity.

As another non-limiting example, the EDOT analog monomer is 3,4-propylenedioxythiophene with the following first formula and the first polymer is a multi-sulfonic acid polymer having the second formula:

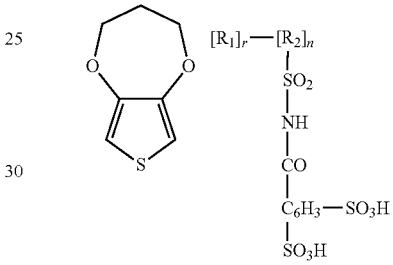

and the ion conducting and electron conducting polymer has the following formula wherein n>1 and m>1:

Formula I

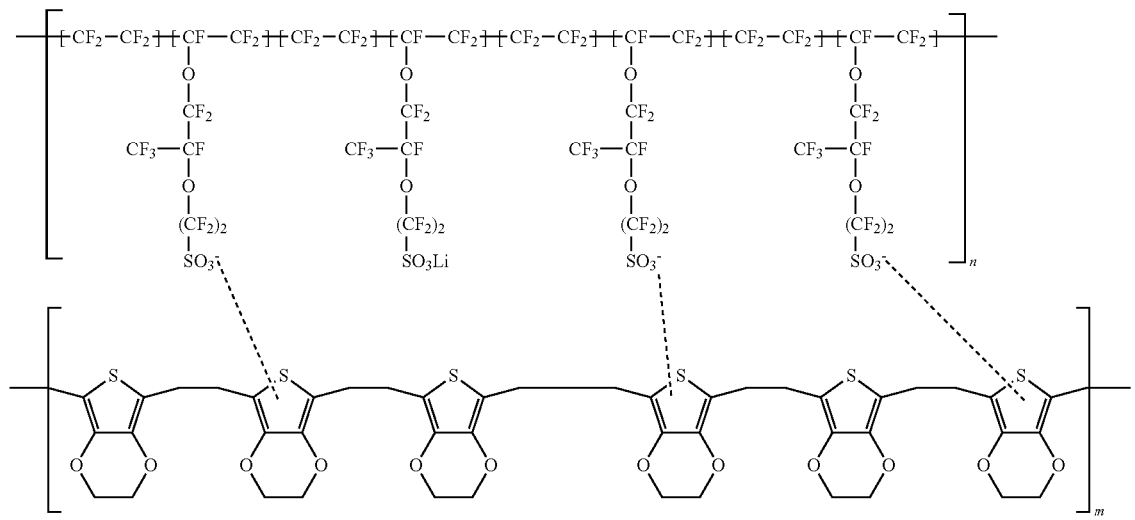

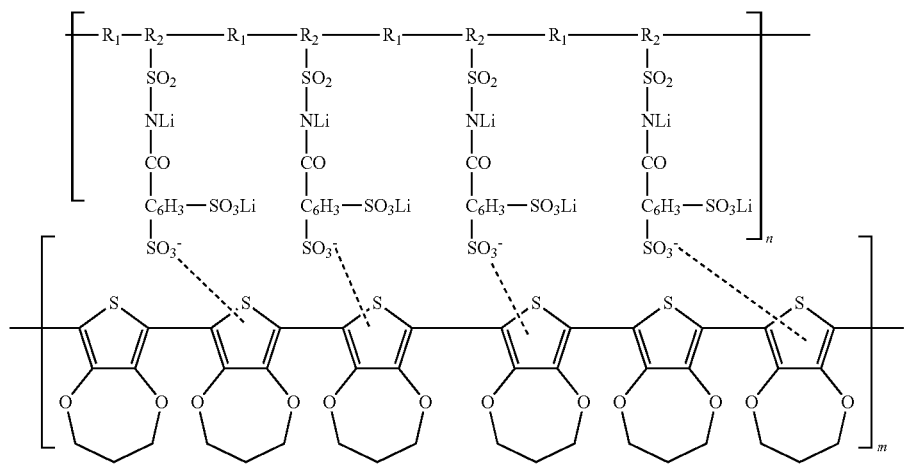

The formula above indicates that the first polymer and second polymer were added in a 1:1 molar ratio during preparation. When excess first polymer is added, a number of branches of $R_2$ would be lithiated at the sulfonic acid end group rather than interacting with the second polymer.

The following generic structure represents PEDOT: multi-lithium sulfonate polymers that are both ion conducting and electron conducting. The resulting polymer is formed of both A and B segments when a single-sulfonic acid is used as the first polymer and formed of either A or A and B when a multi-sulfonic acid is used as the first polymer:

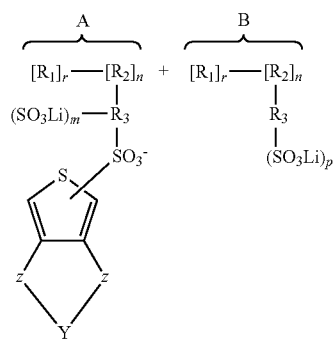

wherein $R_1$ is a linear polymer portion and $R_2$ is a branched polymer portion of a single-sulfonic acid polymer or a multi-sulfonic acid polymer, $R_3$ represents a branch having sulfonic acids substituted with Li or an EDOT analog as depicted; $r \geq 0$; $n>1$; $x>1$; $m=0, 1, 2$ or $3$; and $p=1, 2$ or $3$; and B is randomly located in the PEDOT: multi-lithium sulfonate polymer; and wherein

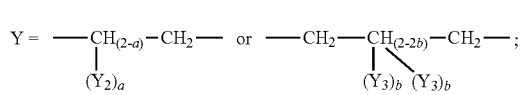

$z=O$ or $S$; $Y_2$=—COH, —$C_6H_{13}$, or —COOH; $a=0$ or $1$; $Y_3$=—$CH_3$, —$C_2H_5$, —$CH_2C_6H_6$, —$C_6H_{13}$, —$C_8H_{17}$, —$CH_2OC_6H_{13}$, or —$CH_2OC_6H_6$; and $b=0$ or $1$.

The following examples are not meant to be limiting. It is noted that the branched portion of the polymer backbone is a repeating unit "n". This provides the repeating EDOT analog monomer that forms the PEDOT analog illustrated in Formula I above.

When the single-sulfonic acid polymer has the following formula:

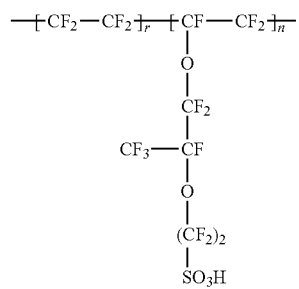

the PEDOT: multi-lithium sulfonate polymer is formed of A and B, respectively, with $n>1$; $r \geq 1$; $m=0$; and $p=1$:

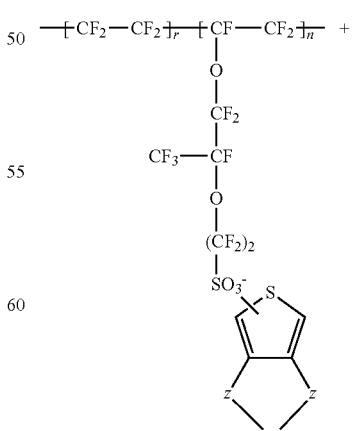

-continued

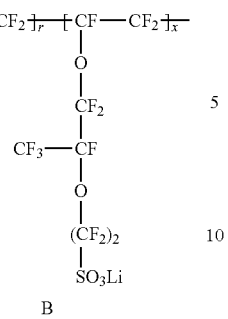

B

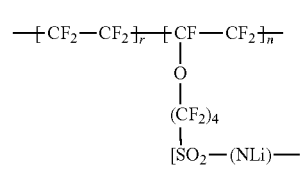

A

When the single-sulfonic acid polymer has the following formula:

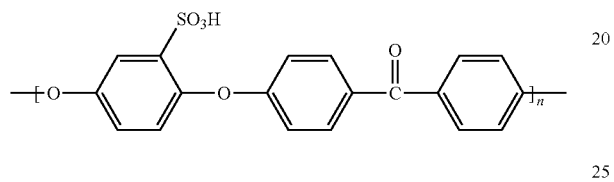

the PEDOT: multi-lithium sulfonate polymer is formed of A and B, respectively, with n>1; r=0; m=0; and p=1:

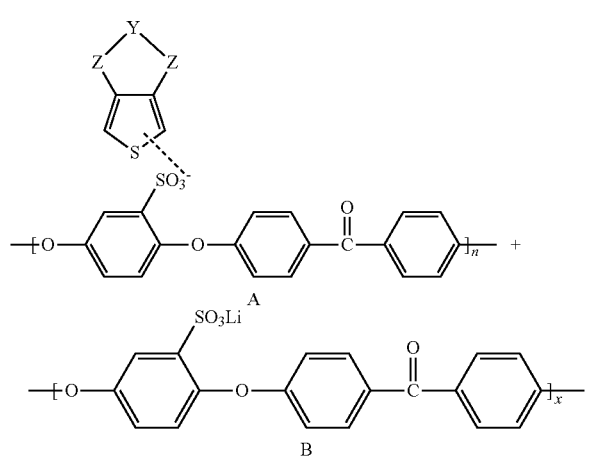

When the branch $R_3$ of the single-sulfonic acid polymer or the multi-sulfonic acid polymer includes —NH—, the branch $R_3$ of the PEDOT: multi-lithium sulfonate polymer includes —NLi— due to the ion exchange with lithium using LiOH or LiCl, converting the —NH— to —NLi—, providing additional ionic conductivity.

When the single-sulfonic acid polymer has the following formula:

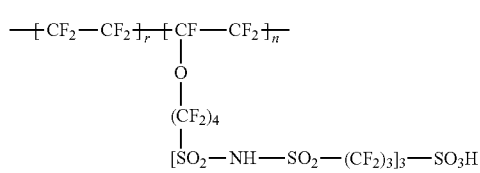

the PEDOT: multi-lithium sulfonate polymer is formed of A and B, with n>1; r≥1; m=0; and p=1:

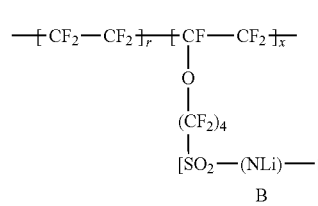

B

When the single-sulfonic acid polymer has the following formula:

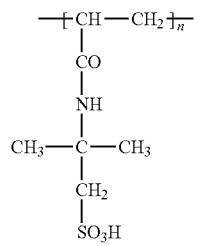

the PEDOT: multi-lithium sulfonate polymer is formed of A and B, with n>1; r=0; m=0; and p=1:

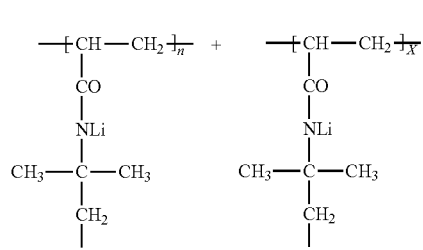

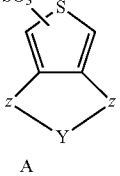

A

When the multi-sulfonic acid polymer has the following formula:

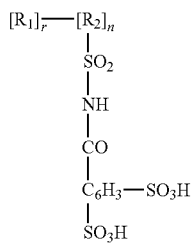

the PEDOT: multi-lithium sulfonate polymer has the following formula, with n>1; r≥1; m=1; and p=0:

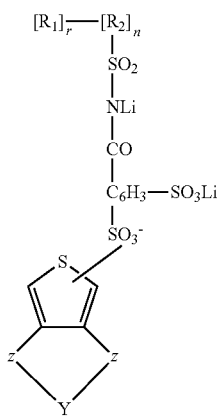

The PEDOT: multi-lithium sulfonate polymer above only has an A component as a 1:1 ratio of first polymer to second polymer was used. When excess first polymer is used, the PEDOT: multi-lithium sulfonate polymer has the following formula, with n>1; r≥1; m=1; and p=2:

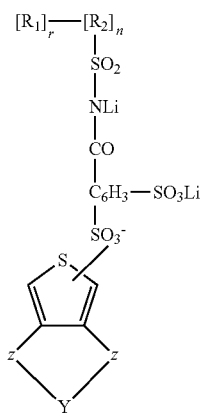

When the multi-sulfonic acid polymer has the following formula wherein $R_f = $—$CF_2$—$CF(CF_3)$—O—$(CF_2)_2$—, —$(CF_2)_4$—, or —$(CF_2)_2$—, r≥1, and n>1:

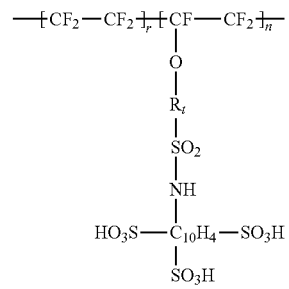

produced from a 1:1 ratio of multi-sulfonic acid polymer to PEDOT analog polymer, the PEDOT: multi-lithium sulfonate polymer has the following formula, with m=2; and p=0:

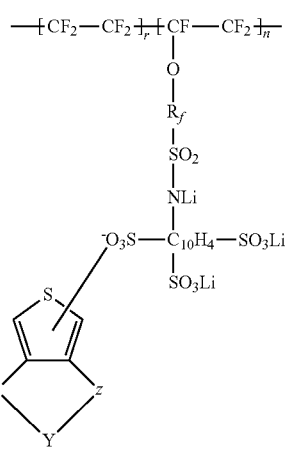

When produced from a ratio greater than 1.0 of multi-sulfonic acid polymer to PEDOT analog polymer, the PEDOT: multi-lithium sulfonate polymer has the following formula, with m=2; and p=3:

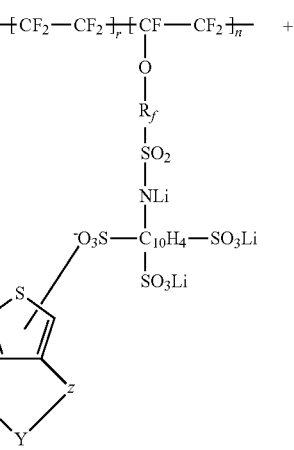

-continued

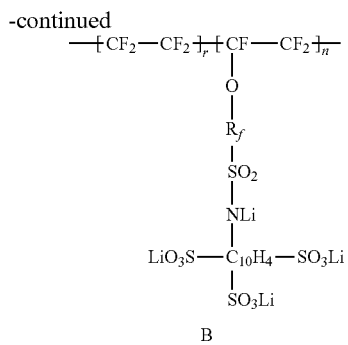

B

The PEDOT: multi-lithium sulfonate polymers that are both ion conducting and electron conducting represent a new class of materials that are flexible and can be used to replace conventional electrode binders and also may replace conductive material added to electrodes. The new material improves the performance of electrochemical devices by adding ionic conductivity to the electrodes. In addition to being used in electrochemical devices, the new material can replace standard indium tin oxide materials in LCD panels, solar cells, organic solar cells, perovskite and organic photovoltaics, optoelectronic devices, organic LED, transparent conductor, antistatic coating of polymer and glass, touch-panels, printed wire boards (PWB), OLED displays and lighting, capacitive touch-switches and sensors, Smartwindows, electroluminescence, supercapacitors, displays, transistors, energy-converters, sensors, organic field effect transistors (OFETs), organic photovoltaics (OPV) devices, electrochromic devices, for example.

Also disclosed are electrodes incorporating the dual ion and electron conducting binders. Electrodes can be anodes and include as active material particles graphite, graphene, silicon, and lithium transition oxides (LTOs), as non-limiting examples. Electrodes can be cathodes and include as active material particles lithium cobalt oxide (LCO), nickel cobalt aluminum (NCA), nickel manganese cobalt (NMC), lithium manganese oxide (LMO), lithium manganese nickel oxide (LMNO) and lithium iron phosphate (LFP), lithium-transition metal phosphate compounds, and lithium-transition metal sulfate compounds as non-limiting examples. The electrodes can have active material particles or other metal oxides such as titanium and ruthenium. The electrodes can include the active material and one or more dual conductive binders disclosed herein. A conducting agent such as carbon is not used, although can be added if so desired.

Also disclosed are electrochemical devices having the electrodes disclosed herein. As a non-limiting example, a lithium-ion battery includes a plurality of unit cell layers. A unit cell layer 10 is illustrated in FIG. 1. Each unit cell layer 10 includes a cathode active material layer 12, an electrolyte layer 14 and an anode active material layer 16. The cathode active material layer 12 is formed on one surface of a current collector 18 and is electrically connected thereto and the anode active material layer 16 is formed on the other surface of the current collector 18 and electrically connected thereto. Each of the electrolyte layers 14 includes a separator serving as a substrate and an electrolyte supported by the separator. As the electrolyte constituting the electrolyte layer 14, a liquid electrolyte, a gel electrolyte or a polymer electrolyte known to those skilled in the art may be used. As examples, the liquid electrolyte may be in the form of a solution in which a lithium salt is dissolved in an organic solvent. The gel electrolyte may be in the form of a gel in which the above-mentioned liquid electrolyte is impregnated into a matrix polymer composed of an ion conductive polymer. When the electrolyte layers 14 are formed by a liquid electrolyte or gel electrolyte, a separator may be used in the electrolyte layer. Examples of the separators are porous films of polyolefin such as polyethylene and polypropylene. The current collector 18 is composed of a conductive material serving as a joining member for electrically connecting the active material layers to the outside.

Figure 2:
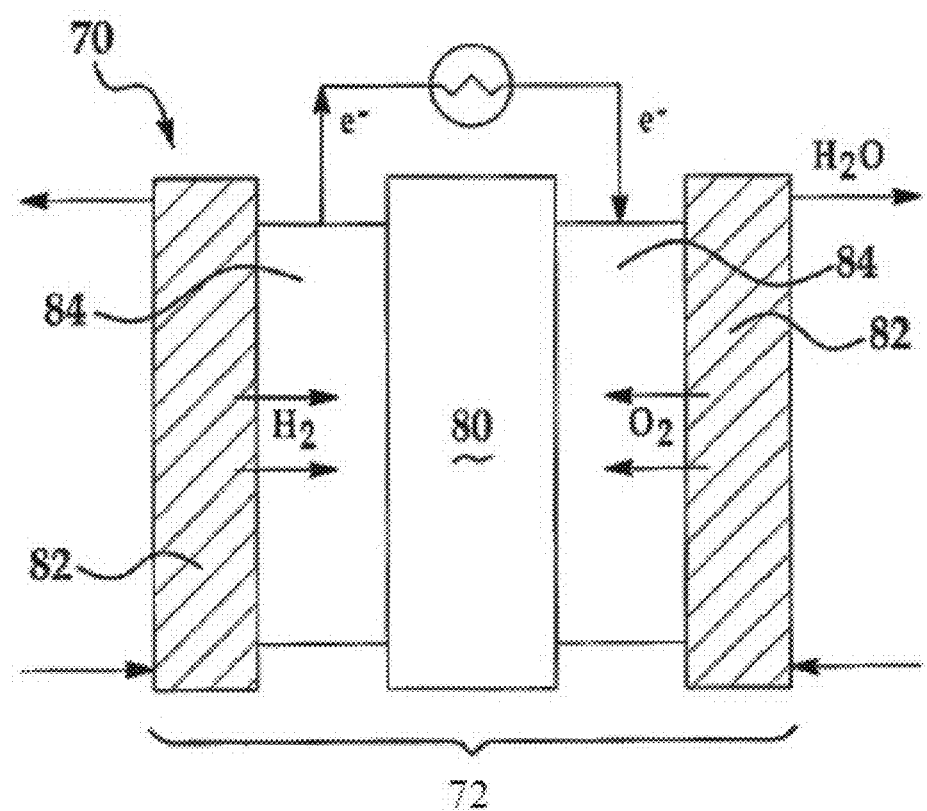
FIG. 2 is schematic of a membrane electrode assembly of a fuel cell incorporating the electrode of FIG. 1.

As another non-limiting example, the electrodes disclosed herein can be used in a fuel cell. FIG. 2 illustrates the use of the dual conductive binders disclosed herein in a fuel cell electrode. FIG. 2 is a schematic of a fuel cell 70, a plurality of which makes a fuel cell stack. The fuel cell 70 is comprised of a single membrane electrode assembly 72. The membrane electrode assembly 72 has a membrane 80 coated with the composite electrocatalyst 84 with a gas diffusion layer 82 on opposing sides of the membrane 80. The membrane 80 has a layer 84 of the active material and binder formed on opposing surfaces of the membrane 80, such that when assembled, the layers 84 of the active material and dual conductive binder are each between the membrane 80 and a gas diffusion layer 82. Alternatively, a gas diffusion electrode is made by forming one layer 84 of the active material and dual conductive binder on a surface of two gas diffusion layers 82 and sandwiching the membrane 80 between the gas diffusion layers 82 such that the layers 84 of active material and dual conductive binder contact the membrane 80. When fuel, such as hydrogen gas (shown as $H_2$), is introduced into the fuel cell 70, the layer 84 splits hydrogen gas molecules into protons and electrons. The protons pass through the membrane 80 to react with the oxidant (shown as $O_2$), such as oxygen or air, forming water ($H_2O$). The electrons ($e^-$), which cannot pass through the membrane 80, must travel around it, thus creating the source of electrical energy.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A PEDOT: multi-lithium sulfonate polymer that is both ion conducting and electron conducting formed of A or formed of A and B:

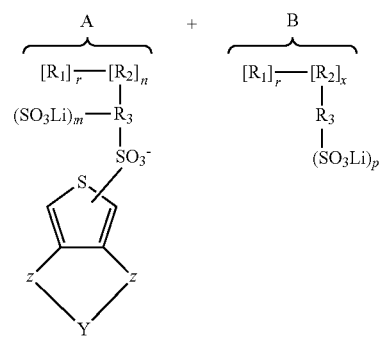

wherein $R_1$ is a linear polymer portion and $R_2$ is a branched polymer portion of a single-sulfonic acid polymer or a multi-sulfonic acid polymer, $R_3$ represents a branch having sulfonic acids substituted with Li or an EDOT analog as depicted;

$r \geq 0$; $n > 1$; $x > 1$; $m = 0, 1, 2$ or $3$ when A and B are present and $m = 1, 2$ or $3$ when only A is present; and $p = 1, 2$ or $3$;

B is randomly located in the PEDOT: multi-lithium sulfonate polymer;

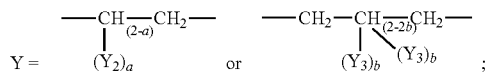

$z = O$ or $S$; $Y_2 = $ —COH, —$C_6H_{13}$, or —COOH; $a = 0$ or $1$; $Y_3 = $ —$CH_3$, —$C_2H_5$, —$CH_2C_6H_6$, —$C_6H_{13}$, —$C_8H_{17}$, —$CH_2OC_6H_{13}$, or —$CH_2OC_6H_6$; and $b = 0$ or $1$.

2. The PEDOT: multi-lithium sulfonate polymer of claim 1, wherein the single-sulfonic acid polymer has the following formula:

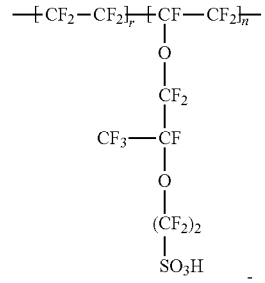

and the PEDOT: multi-lithium sulfonate polymer is formed of A and B, respectively, with $n > 1$; $r \geq 1$; $m = 0$; and $p = 1$:

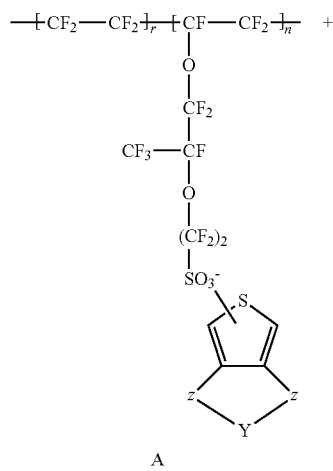

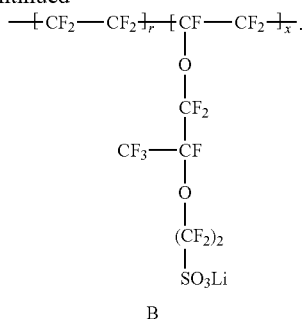

3. The PEDOT: multi-lithium sulfonate polymer of claim 1, wherein the single-sulfonic acid polymer has the following formula:

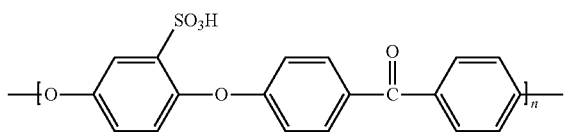

and the PEDOT: multi-lithium sulfonate polymer is formed of A and B, respectively, with $n > 1$; $r = 0$; $m = 0$; and $p = 1$:

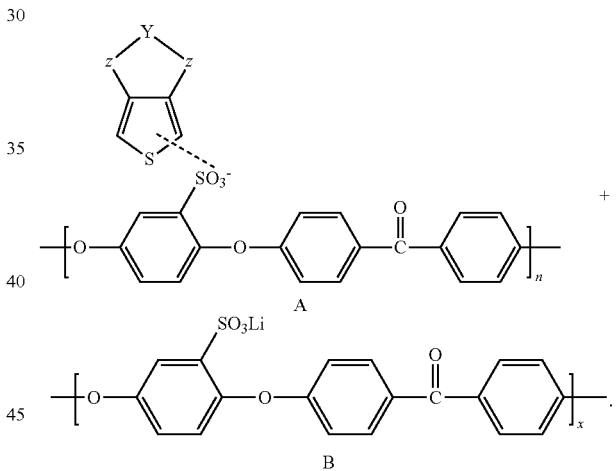

4. The PEDOT: multi-lithium sulfonate polymer of claim 1, wherein when the branch $R_3$ of the single-sulfonic acid polymer or the multi-sulfonic acid polymer includes —NH—, the branch $R_3$ of the PEDOT: multi-lithium sulfonate polymer includes —NLi—.

5. The PEDOT: multi-lithium sulfonate polymer of claim 4, wherein the single-sulfonic acid polymer has the following formula:

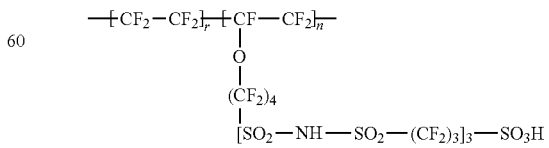

and the PEDOT: multi-lithium sulfonate polymer is formed of A and B, with $n > 1$; $r \geq 1$; $m = 0$; and $p = 1$:

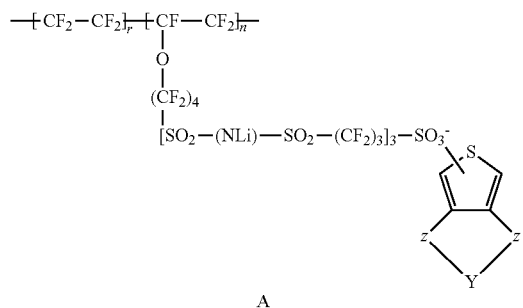

A

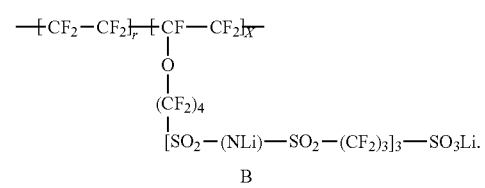

B

6. The PEDOT: multi-lithium sulfonate polymer of claim 4, wherein the single-sulfonic acid polymer has the following formula:

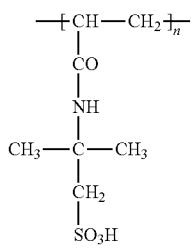

and the PEDOT: multi-lithium sulfonate polymer is formed of A and B, with n>1; r=0; m=0; and p=1:

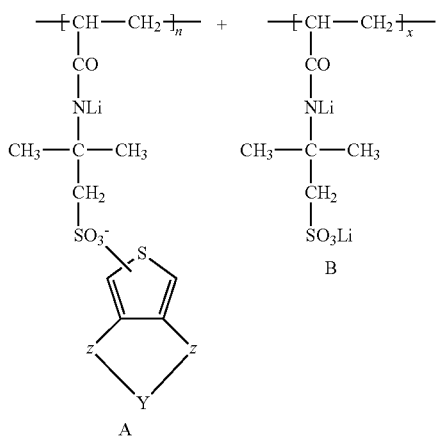

7. The PEDOT: multi-lithium sulfonate polymer of claim 4, wherein the multi-sulfonic acid polymer has the following formula:

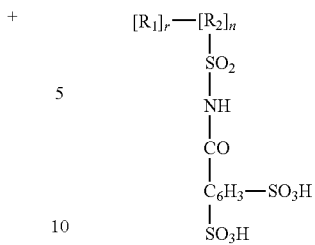

and the PEDOT: multi-lithium sulfonate polymer has the following formula, with n>1; r≥1; m=1; and p=0:

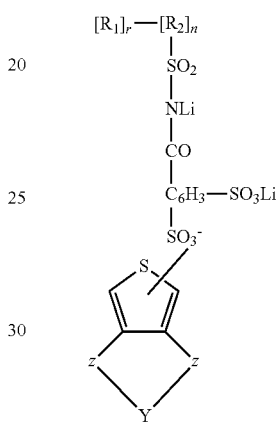

8. The PEDOT: multi-lithium sulfonate polymer of claim 7, wherein the PEDOT: multi-lithium sulfonate polymer has the following formula, with n>1; r≥1; m=1; and p=2:

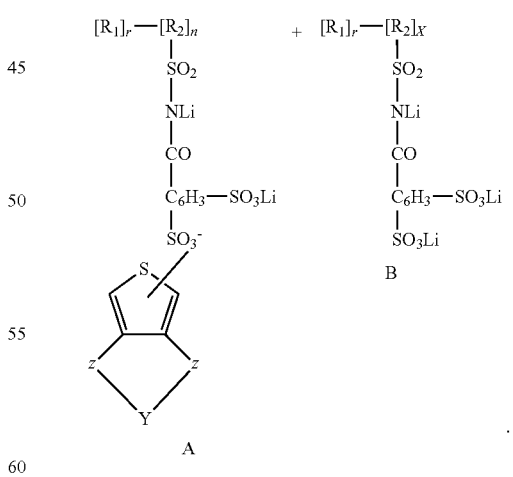

9. The PEDOT: multi-lithium sulfonate polymer of claim 4, wherein the multi-sulfonic acid has the following formula wherein $R_f$=—$CF_2$—$CF(CF_3)$—O—$(CF_2)_2$—, —$(CF_2)_4$—, or —$(CF_2)_2$—, r≥1, and n>1:

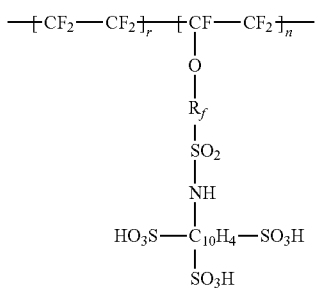

and the PEDOT: multi-lithium sulfonate polymer has the following formula, with m=2; and p=3:

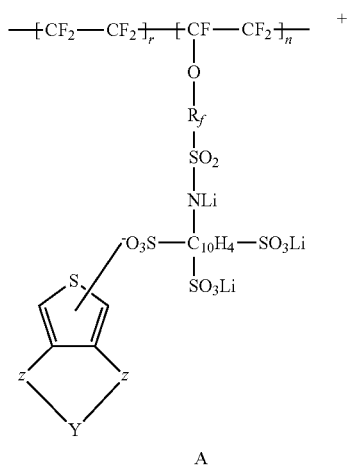

A

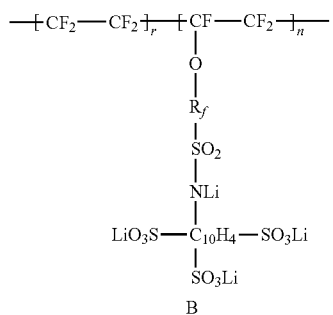

B

10. An electrode for an electrochemical device comprising the PEDOT: multi-lithium sulfonate polymer of claim 1.

11. The PEDOT: multi-lithium sulfonate polymer of claim 1, made by:
  polymerizing an EDOT analog to form a PEDOT analog polymer;
  reacting the PEDOT analog polymer with the single-sulfonic acid polymer or the multi-sulfonic acid polymer, wherein a weight ratio of single-sulfonic acid polymer to PEDOT analog polymer is greater than 1.0 and a weight ratio of multi-sulfonic acid polymer to PEDOT analog polymer is greater than or equal to 1.0;
  ion-exchanging remaining sulfonic acid sites with LiCl or LiOH to produce the PEDOT: multi-lithium sulfonate polymer that is both ion and electron conducting.

12. The PEDOT: multi-lithium sulfonate polymer of claim 4, made by:
  polymerizing the single-sulfonic acid polymer or the multi-sulfonic acid polymer with the EDOT monomer analog; and
  ion-exchanging remaining sulfonic acid sites and —NH— with LiCl or LiOH to produce the PEDOT: multi-lithium sulfonate polymer that is both ion and electron conducting.

13. An ion conducting and electron conducting polymer comprised of a first polymer of a single-sulfonic acid polymer or a multi-sulfonic acid polymer and a second polymer of an EDOT analog monomer having the following formula:

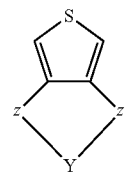

wherein:

$$Y = -CH_{(2-a)}-CH_2- \quad \text{or} \quad -CH_2-CH_{(2-2b)}-CH_2-;$$
$$\phantom{Y = -CH}|\phantom{-a)-CH_2- \text{or} -CH_2-CH}\diagdown$$
$$\phantom{Y = -CH}(Y_2)_a \phantom{-CH_2- \text{or} -CH_2-}(Y_3)_b\ (Y_3)_b$$

z=O or S; $Y_2$=—COH, —$C_6H_{13}$, or —COOH; a=0 or 1; $Y_3$=—$CH_3$, —$C_2H_5$, —$CH_2C_6H_6$, —$C_6H_{13}$, —$C_8H_{17}$, —$CH_2OC_6H_{13}$, or —$CH_2OC_6H_6$; and b=0 or 1;
  wherein a sulfonic acid group of some or all branches of the first polymer electronically interacts with one or more thiophene rings of the second polymer; and
  wherein all remaining sulfonic acid groups on each branch of the first polymer are converted to $SO_3Li$.

14. The ion conducting and electron conducting polymer of claim 13, wherein the EDOT analog monomer is EDOT with the following first formula and the first polymer is a single-sulfonic acid polymer having the second formula:

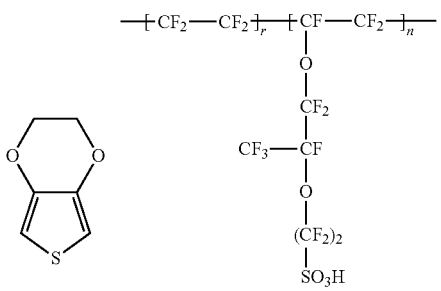

and the ion conducting and electron conducting polymer has the following formula wherein n>1 and m>1:

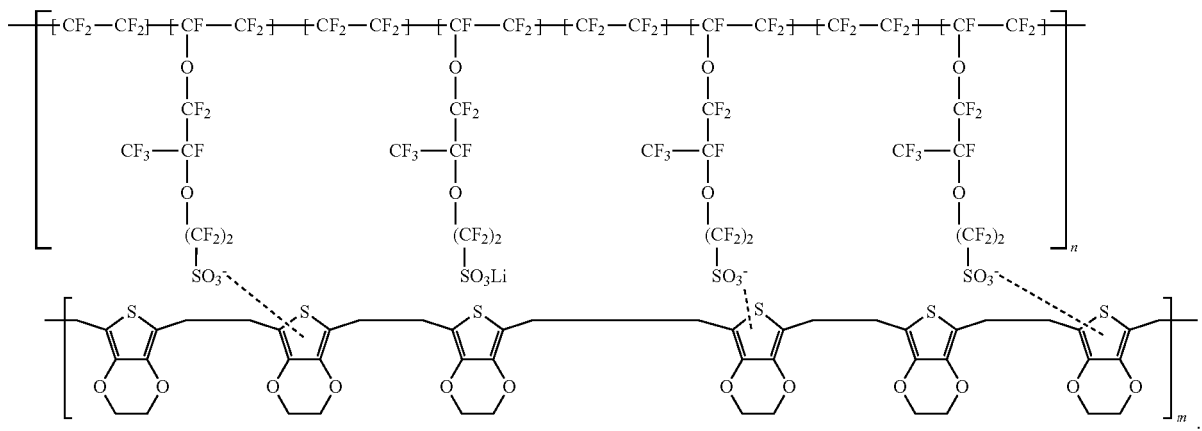

15. The ion conducting and electron conducting polymer of claim 13, wherein when a branch first polymer includes —NH—, the —NH— in the branch are converted to —NLi— in the ion conducting and electron conducting polymer.

16. The ion conducting and electron conducting polymer of claim 15, wherein the EDOT analog monomer is 3,4-propylenedioxythiophene with the following first formula and the first polymer is a multi-sulfonic acid polymer having the second formula:

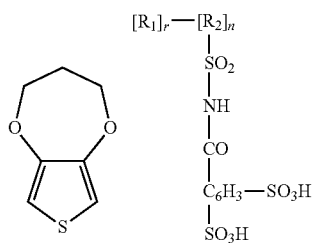

and the ion conducting and electron conducting polymer has the following formula wherein n>1 and m>1:

17. A method of making a PEDOT: multi-lithium sulfonate polymer, comprising:

polymerizing an EDOT analog monomer to form a PEDOT analog polymer;

reacting the PEDOT analog polymer with a single-sulfonic acid polymer or a multi-sulfonic acid polymer, wherein a weight ratio of single-sulfonic acid polymer to PEDOT analog polymer is greater than 1.0 and a weight ratio of multi-sulfonic acid polymer to PEDOT analog polymer is greater than or equal to 1.0;

ion exchanging hydrogen with lithium using LiOH or LiCl to convert —NH— to —NLi— and excess —SO$_3$H to —SO$_3$Li.

18. The method of claim 17, wherein polymerizing is initiated with sodium persulfate at 1:1 molar ratio with EDOT analog monomer and iron (III) sulfate or iron chloride at 1:70 molar ratio with sodium persulfate.

19. The method of claim 17, wherein reacting occurs in a polar solvent at room temperature or less for a period of time greater than 24 hours with continuous stirring and purging.

20. The method of claim 17, wherein the PEDOT: multi-lithium sulfonate polymer has the following structure formed of A or formed of A and B:

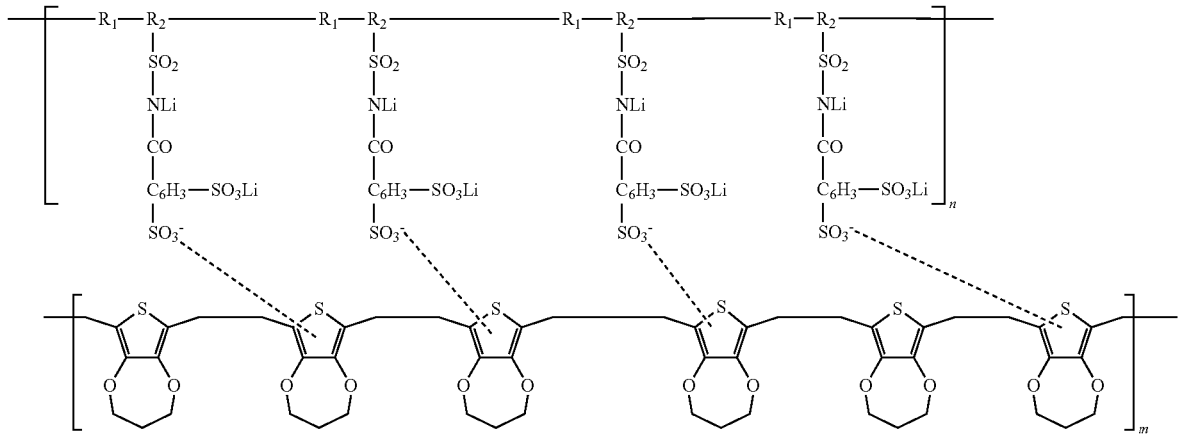

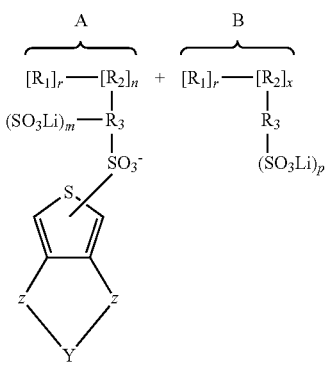

wherein $R_1$ is a linear polymer portion and $R_2$ is a branched polymer portion of a single-sulfonic acid polymer or a multi-sulfonic acid polymer, $R_3$ represents a branch having sulfonic acids substituted with Li or an EDOT analog as depicted; $r \geq 0$; $n>1$; $x>1$; $m=0, 1, 2$ or $3$ when A and B are present and $m=1, 2$ or $3$ when only A is present; and $p=1, 2$ or $3$; and B is randomly located in the PEDOT: multi-lithium sulfonate polymer; and $z=O$ or S;

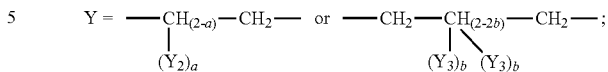

$Y_2$=—COH, —$C_6H_{13}$, or —COOH; $a=0$ or $1$; $Y_3$=—$CH_3$, —$C_2H_5$, —$CH_2C_6H_6$, —$C_6H_{13}$, —$C_8H_{17}$, —$CH_2OC_6H_{13}$, or —$CH_2OC_6H_6$; and $b=0$ or $1$.

21. The method of claim 20, wherein when the single-sulfonic acid is used, the PEDOT: multi-lithium sulfonate polymer is formed of both A and B, and when the multi-sulfonic acid is used, the PEDOT: multi-lithium sulfonate polymer is formed of both A and B when the weight ratio of multi-sulfonic acid polymer to PEDOT analog polymer is greater than 1.0 and formed of A when the weight ratio of multi-sulfonic acid polymer to PEDOT analog polymer is equal to 1.0.

* * * * *